(12) United States Patent
Rumack

(10) Patent No.: US 6,613,836 B2
(45) Date of Patent: Sep. 2, 2003

(54) REACTIVE HOT MELT ADHESIVE

(75) Inventor: Daniel T. Rumack, Randolph, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 09/882,115

(22) Filed: Jun. 15, 2001

(65) Prior Publication Data

US 2003/0008970 A1 Jan. 9, 2003

(51) Int. Cl.$^7$ ............... C08J 3/00; C08K 3/20; C08L 75/00; C08F 8/30; C08F 283/04
(52) U.S. Cl. ............... 524/589; 524/490; 524/507; 524/590; 525/123; 525/455
(58) Field of Search ............... 524/507, 589, 524/590, 490; 525/123, 455

(56) References Cited

U.S. PATENT DOCUMENTS

| | | | |
|---|---|---|---|
| 3,931,077 A | | 1/1976 | Uchigaki et al. |
| 4,775,719 A | | 10/1988 | Markevka |
| 4,808,255 A | * | 2/1989 | Markevka et al. |
| 5,332,786 A | | 7/1994 | Nagata |
| 5,827,393 A | | 10/1998 | Kinzelmann et al. |
| 5,932,680 A | | 8/1999 | Heider |
| 6,136,136 A | | 10/2000 | Heider |
| 6,387,449 B1 | * | 5/2002 | Reid et al. |

FOREIGN PATENT DOCUMENTS

| | | |
|---|---|---|
| DE | 197 27 029 A1 | 7/1999 |
| JP | 53021236 | 8/1976 |
| JP | 8092541 | 9/1994 |
| WO | WO 01/81495 A2 | 1/2001 |

* cited by examiner

*Primary Examiner*—Patrick D. Niland
(74) *Attorney, Agent, or Firm*—Charles W. Almer

(57) ABSTRACT

A reactive polyurethane hot melt adhesive having improved green strength which contains an acrylic resin and/or an acrylic polyol and an aliphatic $C_5$–$C_{10}$ oligomer.

20 Claims, No Drawings

REACTIVE HOT MELT ADHESIVE

FIELD OF THE INVENTION

The invention relates to hot melt adhesives, in particular reactive hot melt adhesives having improved green strength.

BACKGROUND OF THE INVENTION

Hot melt adhesives are solid at room temperature but, upon application of heat, melt to a liquid or fluid state in which form they are applied to a substrate. On cooling, the adhesive regains its solid form. The hard phase(s) formed upon cooling the adhesive imparts all of the cohesion (strength, toughness, creep and heat resistance) to the final adhesive. Curable hot melt adhesives, which are also applied in molten form, cool to solidify and subsequently cure by a chemical crosslinking reaction. An advantage of hot melt curable adhesives over traditional liquid curing adhesives is (1) their ability to provide "green strength" upon cooling prior to cure and (2) provide adhesives of very low crosslinking density and thus high levels of flexibility and toughness.

The majority of reactive hot melts are moisture-curing urethane adhesives. These adhesives consist primarily of isocyanate terminated polyurethane prepolymers that react with surface or ambient moisture in order to chain-extend, forming a new polyurethane polymer. Polyurethane prepolymers are conventionally obtained by reacting diols with diisocyanates. Pure diols are favored for use, instead of polyols with higher functionality, to avoid excessive branching that can lead to poor pot stability. Methylene bisphenyl diisocyanate (MDI) is favored over lower molecular weight isocyanates to minimize volatility. Cure is obtained through the diffusion of moisture from the atmosphere or the substrates into the adhesive, and subsequent reaction. The reaction of moisture with residual isocyanate forms carbamic acid. This acid is unstable, decomposing into an amine and carbon dioxide. The amine reacts rapidly with isocyanate to form a urea. The final adhesive product is a lightly crosslinked material held together primarily through hydrogen bonding, urea groups and urethane groups.

The prior art discloses that that the performance of reactive hot melt adhesives for most applications may be substantially improved by the incorporation of acrylic polymers into conventional polyurethane adhesives, in particular reactive hydroxy-containing and non-reactive acrylic copolymers. Improvement in green strength may be obtained by adding higher molecular weight polymers (reactive or not) and/or incorporating crystalline diols, most commonly polyester diols.

These prior art adhesives are extremely tough, with outstanding low temperature flexibility, heat and chemical resistance, and specific adhesion to polar substrates. Adhesion to a wide range of other substrates may be obtained through the addition of adhesion promoters such as silane coupling agents. Despite these advances in the art, there remains a need for improvements in reactive hot melt technology to expand the application of such adhesives and their effectiveness in such applications. The present invention addresses this need.

SUMMARY OF THE INVENTION

The invention provides a moisture curable reactive hot melt adhesive having improved green strength.

One aspect of the invention is directed to a polyurethane reactive hot melt composition containing a polyester polyol, a polyether polyol, and/or a hydroxyl-functional acrylic polymer and an effective amount of an aliphatic $C_5$–$C_{10}$ oligomer. A preferred aliphatic $C_5$–$C_{10}$ oligomer is a terpene oligomer. The composition may also include a non-functional acrylic polymer.

Another aspect of the invention is directed to a method of improving the green strength of a polyurethane adhesive comprising adding an effective amount of an aliphatic $C_5$-$C_{10}$ oligomer to a reactive hot melt adhesive formulation, wherein the adhesive comprises an acrylic resin and/or an acrylic polyol.

Still another aspect of the invention is directed to a method for bonding materials together which comprises applying the reactive hot melt adhesive composition of the invention in a liquid form to a first substrate, bringing a second substrate in contact with the composition applied to the first substrate, and subjecting the applied composition to conditions which will allow the composition to cool and cure to an irreversible solid form, said conditions comprising moisture.

Yet another aspect of the invention is directed to an article of manufacture comprising the adhesive of the invention.

DETAILED DESCRIPTION OF THE INVENTION

The disclosures of all documents cited herein are incorporated in their entireties by reference.

It has now been discovered that the addition of an aliphatic $C_5$–$C_{10}$ terpene oligomer to a hot melt polyurethane containing acrylic resins, in particular reactive hydroxy-containing and/or non-reactive acrylic copolymers results in a reduction in viscosity with little or no loss in green strength. Viscosity can, if desired, be adjusted to produce an adhesive with similar viscosity and improved green strength. A preferred oligomer for use in the practice of the invention is an alpha-pinene oligomer such as Sylvares TR-A25, commercially available from Arizona Chemical.

The moisture curable, hot melt polyurethane adhesives of the invention may be prepared through the reaction of a mixture of polyols with an isocyanate-containing compound at a temperature of from about 250° F. to about 275° F. The preferred isocyanate-containing compound is MDI. The polyols used include polyether, polyester and/or hydroxy-functional polymers. Non-functional acrylic can advantageously be added, and is required if no functional acrylic is included in the formulation. To this mixture the terpene oligomer is added in an amount of from about 2 to about 25%, more preferably from about 10% to about 20%, and most preferably from about 10% to about 15%.

The urethane prepolymers which can be used to prepare the adhesives of the invention are those conventionally used in the production of polyurethane hot melt adhesive compositions. Any suitable compound which contains two or more isocyanate groups may be used for preparing the urethane prepolymers. Typically from about 5 to about 25 parts by weight of an isocyanate is used.

Organic polyisocyanate which may be used to practice the invention include alkylene diisocyanates, cycloalkylene diisocyanates, aromatic diisocyanates and aliphatic-aromatic diisocyanates. Specific examples of suitable isocyanate-containing compounds; include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclohexylene-1,4-diisocyanate cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, 4,4',4"-triisocyanatotriphenylmethane, 1,3,5-triisocyanato-benzene, 2,4,6-triisocyanato-toluene, 4,4'-dimethyldiphenyl-methane-2,2',5,5-tetratetraisocyanate, and the like. While such compounds are commercially available, methods for synthesizing such compounds are well known in the art. Preferred isocyanate-containing compounds are methylenebisphenyldiisocyanate (MDI), isophoronecliisocyanate (IPDI) and toluene diisocyanate (TDI).

Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyaikylene ether glycols or polyhydroxy polyalkylene ethers), polyhydroxy polyesters, the ethylene or propylene oxide adducts of polyols and the monosubstituted esters of glycerol, as well as mixtures thereof. The polyol is typically used in an amount of between about 1 to about 70 parts by weight.

Examples of polyether polyols include a linear and/or branched polyether having plural numbers of ether bondings and at least two hydroxyl groups, and contain substantially no functional group other than the hydroxyl groups. Examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl) propane, triethanolamine, triisopropanolamine, ethylenediamine and ethanolamine; with at least one compound selected from the group consisting of ethylene oxide, propylene oxide and butylene oxide.

A number of suitable polyols are available commercially. Non-limiting examples include CP4701 (Dow Chemicals), Niax 11–34 (Union Carbide Corp), Desmophen 3900 (Bayer), Propylan M12 (Lankro Chemicals), Highflex 303 (Daiichi Kogyo Seiyaku K. K.) and Daltocel T 32–75 (ICI). "Polymer polyols" are also suitable, i.e. graft polyols containing a proportion of a vinyl monomer, polymerised in situ, e.g., Niax 34–28.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol mnonoethyl ether, diethylene glycol, 2-ethylhexanediol-1,4, cyclohexanediol-1,4, 1,2,6-hexanetriol, 1,3,5-hexanetriol, 1,3-bis-(2-hydroxyethoxy) propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. In accordance with one embodiment of the invention, the hydroxyl containing acrylic polymer may function as the polyol component, in which case, no additional polyol need be added to the reaction.

Further, small amounts of low molecular weight dihydroxy, diamino, or amino hydroxy compounds may be used such as saturated and unsaturated glycols, e.g., ethylene glycol or condensates thereof such as diethylene glycol, triethylene glycol, and the like; ethylene diamine, hexamethylene diamine and the like; ethanolamine, propanolamine, N-methyidiethanolamine and the like.

Virtually any ethylenically unsaturated monomer containing hydroxyl functionality greater than one may be utilized in the compositions of the present invention. Most commonly employed are hydroxyl substituted $C_1$ to $C_{12}$ esters of acrylic and methacrylic acids including, but not limited to hydroxyl substituted methyl acrylate, ethyl acrylate, n-butyl acrylate, 2-ethylhexyl acrylate, isobutyl acrylate, n-propyl or iso-propyl acrylate or the corresponding methacrylates. Mixtures of compatible (meth)acrylate monomers may also be used. Additional monomers that may be used include the hydroxyl substituted vinyl esters (vinyl acetate and vinyl propionate), vinyl ethers, fumarates, maleates, styrene, acrylonitrile, etc. as well as comonomers thereof.

These monomers may blended with other copolymerizable comonomers as formulated so as to have a wide range of Tg values, as between about −48° C. and 105° C., preferably 15° C. to 85° C. Suitable comonomers include the $C_1$ to $C_{12}$ esters of acrylic and methacrylic acids including, but not limited to methyl acrylate, ethyl acrylate, n-butyl acrylate, isobutyl acrylate, 2-ethylhexyl acrylate, n-propyl or iso-propyl acrylate or the corresponding methacrylates. Mixtures of compatible (meth)acrylate monomers may also be used. Additional monomers that may be used include the vinyl esters (vinyl acetate and vinyl propionate), vinyl ethers, fumarates, maleates, styrene, acrylonitrile, ethylene, etc. as well as comonomers thereof. The hydroxyl containing monomers may be the same or different from the monomers used in the remainder of the acrylic polymerization. The particular monomers selected will depend, in large part, upon the end use for which the adhesives are intended. Thus, adhesives to be used in pressure sensitive applications or in applications wherein adhesion to metal is required will be selected to obtain a lower Tg polymer than may be desired in non-pressure sensitive applications or those involving more easily bonded substrates.

When the adhesive is to be prepared utilizing monomeric materials, the respective monomers may be added to the polyols and polymerized therein prior to formation of the prepolymer or may be added to the already formed prepolymer and the acrylic polymerization subsequently performed. In the case of polyamino or polymercapto containing prepolymers, in-situ vinylic polymerization must be performed only in the pre-formed prepolyrner.

The hydroxyl containing ethylenically unsaturated monomer is polymerized using conventional free radical polymerization procedures to a relatively low molecular weight. For purposes of clarification, use of the term "low molecular weight" means number average molecular weights in the range of approximately 2,000 to 50,000, preferably 5,000 to 30,000. Molecular weight distribution is characterized by Gel Permeation Chromatography using a PL Gel,Mixed 10 micron column, a Shimadzu Model RID 6A Detector with a tetrahydrofuran carrier solvent at a flow rate of 1 milliliter per minute. The low molecular weight is obtained by careful monitoring and controlling the reaction conditions and, generally, by carrying out the reaction in the presence of a chain transfer agent such as dodecyl mercaptan. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 10 to 70% of the urethane prepolymer and 30 to 90% of the low molecular weight hydroxyl containing polymer.

It is also possible to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

Optionally, the hydroxyl containing functionality may be introduced into the adhesive in the form of pre-polymerized low molecular weight hydroxyl containing polymers. In the latter case, typical polymers include hydroxyl substituted butyl acrylate, hydroxylated butyl acrylate/methyl methacrylate copolymers, hydroxylated ethyl acrylate/methyl methacrylate copolymers, and the like. Preferred polymers have a number average molecular weight of 5,000 to 30,000 and a hydroxyl number of 4 to 30. If used in the form of low molecular weight polymers, the polymers may be blended with the polyol prior to reaction thereof with the isocyanate or they may be added directly to the isocyanate terminated prepolymer.

Preferred embodiments of the adhesive of the invention typically comprise from about 5 to about 50 parts by weight of an isocyanate and will contain a polyol mixture comprising from about 10 to about 50% of a polyether, from about 0 to about 40% of a polyester and from about 0 to about 90% of a hydroxyl-functional acrylic resin. Up to about 50% of a non-functional acrylic may optional be added. If the formulation contains no functional acrylic, a non-functional acrylic is required for use in the practice of the invention. Preferred embodiments of the acrylic-containing formulations of the invention will contain from about 10 to about 15 weight % of the alpha-pinene oligomer.

While the adhesives may be used directly as described above, if desired the adhesives of the present invention may also be formulated with conventional additives which are compatible with the composition. Such additives include plasticizers, compatible tackifiers, catalysts, fillers, antioxidants, pigments, adhesion promoters, stabilizers and the like. Conventional additives which are compatible with a composition according to this invention may simply be determined by combining a potential additive with the composition and determining if they are compatible. An additive is compatible if it is homogenous within the product.

The reactive hot melt adhesives of the invention may also contain flame retardant components. Fire retardant additives known in the art for imparting flame resistance to polyurethane compositions may be added. Such compounds include inorganic compounds such as a boron compound, aluminum hydroxide, antimony trioxide and the like, and other halogen compounds including halogen-containing phosphate compounds such as tris(chloroethyl)phosphate, tris(2,3-dichloropropyl)-phosphate, and the like. These and other flame retarding compositions are described in U.S. Pat. Nos. 3,773,695 4,266,042, 4,585,806, 4,587,273 and 4849467, and European Patent No. 0 587 942. In a preferred embodiment, ethylenebistetrabromophthalimide and/or tris (2,3-dibromopropyl)-isocyanurate is added as a prime flame retardant component. The ethylenebistetrabromophthalimide and/or tris(2,3-dibromopropyl)isocyanurate may be used with or without other flame retardants. The composition may further comprise a chlorinated paraffin and/or an aryl phosphate ester as a further flame retardant component. The optional chlorinated paraffin imparts flame retardancy as well as performing as a viscosity modifier. The aryl phosphate ester further imparts improved adhesion to the substrates. The flame retardant polyurethane-based reactive hot melt adhesives when used in the practice of the invention gives excellent flame retardancy while maintaining the targeted properties of the base polymer, such as good green strength, controlled setting speed and good thermal stability at elevated temperatures.

This invention also provides a method for bonding articles together which comprises applying the reactive hot melt adhesive composition of the invention in a liquid melt form to a first article, bringing a second article in contact with the composition applied to the first article, and subjecting the applied composition to conditions which will allow the composition to cool and cure to a composition having an irreversible solid form, said conditions comprising moisture. The composition is typically distributed and stored in its solid form, and is stored in the absence of moisture. When the composition is ready for use, the solid is heated and melted prior to application. Thus, this invention includes reactive polyurethane hot melt adhesive compositions in both its solid form, as it is typically to be stored and distributed, and its liquid form, after it has been melted, just prior to its application.

After application, to adhere articles together, the reactive hot melt adhesive composition is subjected to conditions that will allow it to solidify and cure to a composition that has an irreversible solid form. Solidification (setting) occurs when the liquid melt is subjected to room temperature. Curing, i.e. chain extending, to a composition that has an irreversible solid form, takes place in the presence of ambient moisture.

As used herein, "irreversible solid form" means a solid form comprising polyurethane polymers extended from the aforementioned polyurethane prepolymers. The composition having the irreversible solid form typically can withstand temperatures of up to 150° C. Using ethylenebistetrabromophthalimide as a flame retardant, the thermal stability of the irreversible solid can be improved.

The reactive hot melt composition of the invention is useful for bonding articles composed of a wide variety of substrates (materials), including but not limited to wood, metal glass and textiles. Non-limiting examples include use in laminating such as RV sidewalls, office partitions white boards and structural insulated panels, for use in veneering such as in floors and furniture, millwork, speaker assembly, shoes, as a glazing/backbedding compound, books, in appliance assembly, in furniture assemble and in the manufacture of doors The invention is further illustrated by the following non-limiting examples.

EXAMPLES

In the Examples that follow, the following test were used to determine viscosity and dynamic peel rate.
Viscosity:
Brookfield Viscometer with Thermosel heating unit, spindle 27
Dynamic Peel:
A 6 mil film of the adhesive was applied to a glass plate, preheated at 120° C. A strip of vinyl (16mm wide, 7 mil thick) with a hole punched near one end was applied over the adhesive. The plate is inverted and, at several temperature intervals, a 103 g weight was applied to the hole in the vinyl for 10–60 seconds. The peel rate at these intervals was calculated.

Example 1

The effect of the alpha-pinene oligomer Sylvares TR-A25 was compared in a polyurethane formulation comprising a polyether, a polyester, an acrylic and a functional acrylic. Control Sample A contained 16.70% PolyG 20–56 (a 2000 MW polyether polyol available from Arch), 18.25% Dynacoll 7360 (a 3750 MW hexanediol adipate available from Creanova), 30.65% Elvacite 2016 (55° C. Tg/65,000 Mw acrylic available from Ineos), 16.70% Elvacite 2967 (17° C Tg/20,000 Mw acrylic, OH-functional available fromineos), 0.15% Modaflow (an acrylic defoamer available from Solutia), 15.30% Mondur M (4,4' MDI available from Bayer) and 2.25% Hardener OZ (urethane bisoxazolidine curing agent available from Bayer). The effects of Sylvares TR-A25 (Sample B) and two other diluents (Samples C and D) in this formulation was observed. Results are shown in Table 1.

TABLE 1

| Formulation | Diluent | Viscosity at 250° F. (cP) | Dynamic Peel Rate at 50° C. (mm/min) |
|---|---|---|---|
| Sample A | None | 34,100 | 6 |
| Sample B | TR-A25 (10%) | 11,800 | 30 |
| Sample C | Unitac R-40 (15%) | 10,900 | 39 |
| Sample D | DIDP (10%) | 11,500 | 92 |

In this type of reactive hot melt formulation, the terpene oligomer was the most effective diluent in minimizing the increase in dynamic peel rate while producing a large viscosity reduction. Unitac R-40 (a rosin ester available from Arizona) was similar in its effect, although at a higher level, but its use is not as general as the terpene. Both were better than the diisodecyl phthalate (DIDP, available from ExxonMobil).

Example 2

The effect of the alpha-pinene oligomer Sylvares TR-A25 was compared in a polyurethane formulation comprising a polyether, a polyester, and an acrylic. Control Sample E contained 19.80% PolyG 20–56,19,80% PolyG 20–28 (a 4000 MW polyether polyol available from Arch), 19.80% Dynacoll 7360, 28.20% Elvacite 2016, 0.90% Modaflow, 11.30 % Mondur M and 0.2% DMDEE (a catalyst available from Rhein Chemie). The effects of Sylvares TR-A25 (Sample F and G) in this formulation was observed. Results are shown in Table 2.

TABLE 2

| Formulation | Diluent | Viscosity at 250° F. (cP) | Dynamic Peel Rate at 38° C. (mm/min) |
|---|---|---|---|
| Sample E | None | 12,800 | 48 |
| Sample F | TR-A25 (15%) | 6,300 | 102 |
| Sample G | TR-A25 (15%) | 8,250 | 57 |

In this type of adhesive formulation, a reduction in viscosity with the terpene oligomer is also observed in this type of adhesive formulation. When the level of MDI was reduced from 9.6% in Sample F to 8.5% in Sample G, improvement in green strength as measured by dynamic peel to a level similar to that of Sample E could be achieved, but at a viscosity that is still 35% lower. Thus, it is possible to lower the viscosity with little or no impact on green strength or to improve green strength with little or no impact on viscosity.

Example 3

The effect of the alpha-pinene oligomer Sylvares TR-A25 was compared in a polyurethane formulation comprising a polyether, an acrylic and a functional acrylic. Control Sample H contained 1.25% TiO$_2$ Dispersion GRK 814 (45% TiO$_2$ in PolyG 20–56 available from Spectrum Dispersions), 3.70% PolyG 20–56, 6.20% Elvacite 2901 (80° C. Tg/50,000 Mw acrylic, OH-functional available from Ineos), 34.0% Elvacite 2013 (80° C. Tg/50,000 Mw acrylic available from Ineos), 6.20% Elvacite 2967, 0.15% Modaflow, and 15.30% Mondur M. The effects of Sylvares TR-A25 (Sample I, J and K) and another diluent (Sample L) in this formulation was observed. Results are shown in Table 3.

TABLE 3

| Formulation | Diluent | Viscosity at 275° F. (cP) | Dynamic Peel Rate at 38° C. (mm/min) | Dynamic Peel Rate at 55° C. (mm/min) |
|---|---|---|---|---|
| Sample H | None | 7500 | 3 | 91 |
| Sample I | TR-A25 (15%) | 3600 | 5 | 119 |
| Sample J | TR-A25 (15%) | 9100 | 1 | 38 |
| Sample K | TR-A25 (20%) | 4700 | 3 | 79 |
| Sample L | Unitac R-40 (15%) | 5400* | 2 | 63 |

*product reported as stringy

As can be seen by this example, in polyester-free reactive hot melts a large viscosity reduction is seen with little impact on green strength and the ability to increase the viscosity back to that of the control with a resulting increase in green strength. The data for the rosin ester R-40 looks similar to the effect observed in the formulation of Example 1, but the product was reported as very stringy, probably due to incompatibility. An attempt to use the higher softening point rosin ester R-85 resulted in gelling of the reaction mixture.

Example 4

The effect of the alpha-pinene oligomer Sylvares TR-A25 was compared in a polyurethane formulation comprising a polyether and a polyester. Control Sample M contained 29.75% PolyG 20–56, 59.50% Dynacoll 7360, 0.20% Modaflow and 10.55% Mondur M. The effect of Sylvares TR-A25 in this formulation was observed. Results are shown in Table 4.

TABLE 4

| Formulation | Diluent | Viscosity at 250° F. (cP) | Dynamic Peel Rate at 38° C. (mm/min) |
| --- | --- | --- | --- |
| Sample M | None | 79,200 | 82 |
| Sample N | TR-A25 (10%) | 101,700 | 76 |

In formulations containing terpene oligomers in polyurethane hot melt adhesives with no acrylic in the composition, the terpene oligomer provides no benefit, unlike that observed in the acrylic-containing formulations. The addition of the terpene oligomer actually results in an increase in the viscosity with no change in the green strength.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A polyurethane hot melt adhesive consisting of an isocyanate, a polyol, a non-reactive or reactive acrylic polymer and an aliphatic $C_5$–$C_{10}$ oligomer.

2. The adhesive of claim 1 wherein the aliphatic $C_5$–$C_{10}$ oligomer is a terpene oligomer.

3. The adhesive of claim 2 which comprises from about 2 to about 25% of the terpene oligomer.

4. The adhesive of claim 3 wherein the terpene oligomer is an alpha-pinene oligomer.

5. The adhesive of claim 1 which comprises a non-reactive acrylic polymer.

6. The adhesive of claim 1 which comprises a functional acrylic polymer.

7. The adhesive of claim 1 which is a hydroxy functional acrylic polymer.

8. A method of improving the green strength of a polyurethane adhesive consisting of adding from about 2% to about 25% of an aliphatic $C_5$–$C_{10}$ oligomer to an adhesive formulation, wherein the adhesive formulation consists of an acrylic resin and/or an acrylic polyol, an isocyanate, polyurethane, and/or a polyol.

9. The method of claim 8 wherein the aliphatic $C_5$–$C_{10}$ oligomer is a terpene oligomer.

10. The method of claim 9 wherein the terpene oligomer is an alpha-pinene oligomer.

11. The method of claim 8 which comprises a non-reactive acrylic polymer.

12. The method of claim 8 which comprises a functional acrylic polymer.

13. The method of claim 12 which is a hydroxy functional acrylic polymer.

14. A method for bonding materials together which comprises applying the reactive hot melt adhesive composition of claim 1 in a liquid form to a first substrate, bringing a second substrate in contact with the composition applied to the first substrate, and subjecting the applied compositions to conditions which will allow the composition to cool and cure to an irreversible solid form, said conditions comprising moisture.

15. The method of claim 14 wherein the aliphatic $C_5$–$C_{10}$ oligomer is a terpene oligomer.

16. The method of claim 15 wherein the terpene oligomer is an alpha-pinene oligomer.

17. The method of claim 14 which comprises a non-reactive acrylic polymer.

18. The method of claim 14 which comprises a functional acrylic polymer.

19. The method of claim 18 which is a hydroxy functional acrylic polymer.

20. An article of manufacture comprising the adhesive of claim 1.

* * * * *